June 27, 1967  I. H. J. BOURNE  3,328,083
HEADREST ATTACHMENT FOR VEHICLE SEATS
Filed March 22, 1966
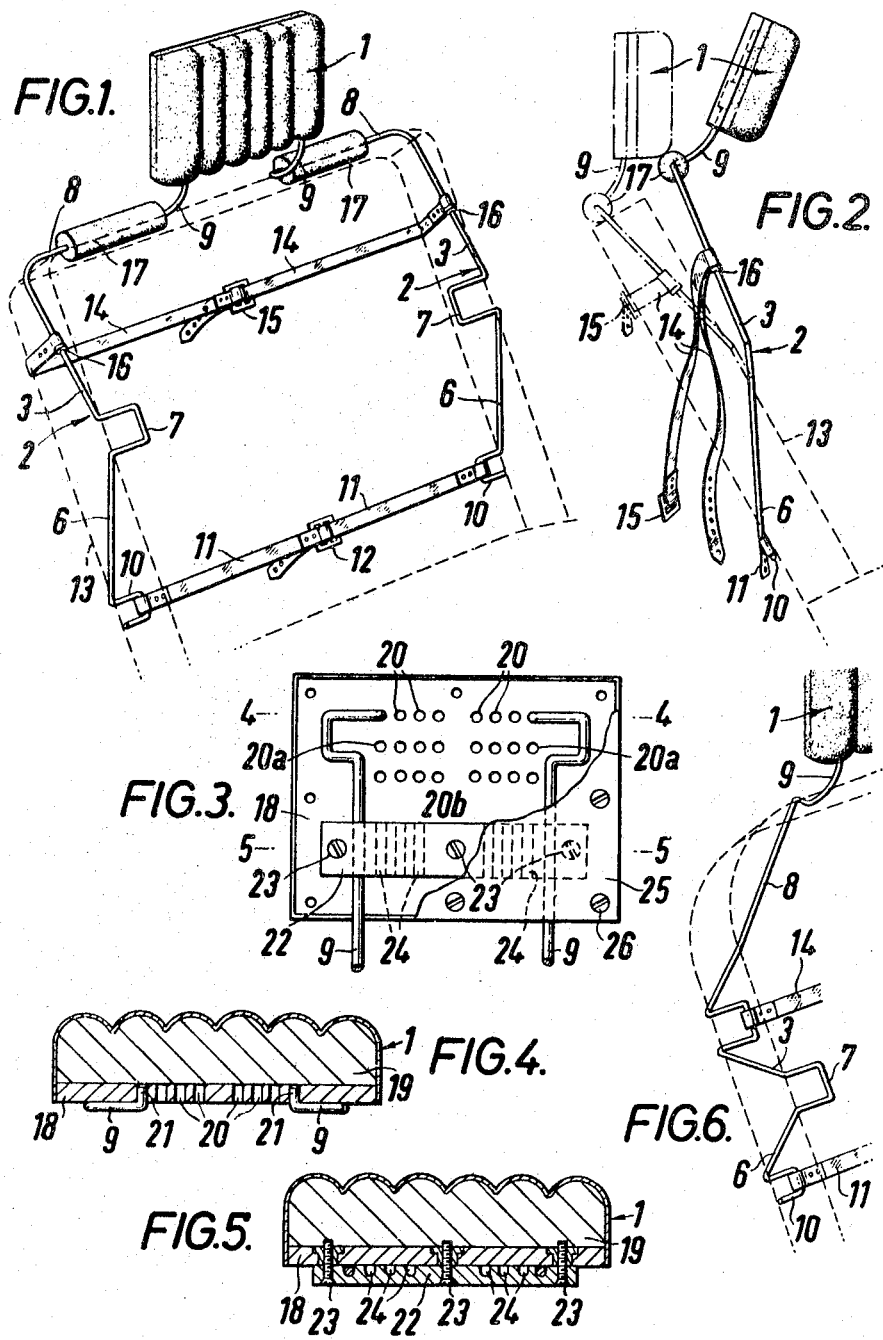
INVENTOR
ISAAC H. J. BOURNE
BY
ATTORNEY United States Patent Office 3,328,083
Patented June 27, 1967

3,328,083
HEADREST ATTACHMENT FOR VEHICLE SEATS
Isaac Henry John Bourne, 14 Burntwood Ave.,
Hornchurch, Essex, England
Filed Mar. 22, 1966, Ser. No. 536,335
Claims priority, application Great Britain, Apr. 1, 1965,
13,807/65
11 Claims. (Cl. 297—404)

This invention relates to an attachment for fitting a headrest on car and like seats.

A problem which arises in connection with devices for fixing headrests to existing upholstered vehicle seats is that such devices desirably should be of simple construction, economic to produce and easy to fit, while yet at the same time ensuring a firm and stable fixture of the headrest on the upholstered back squab of the seat, which, because of its upholstery and yielding nature, affords a far from ideal base for stable mounting.

With these considerations in view there is provided according to the present invention a headrest attachment for a vehicle seat comprising a headrest mounted at the top of a frame which is adapted for fitment to the lateral sides of the back squab of a vehicle seat, and which is resiliently bendable longitudinally and is provided at three longitudinally spaced regions thereof with bracing devices for securing the frame to the back squab, the bracing devices being adapted for application to the front and rear sides of the back squab alternately so as to exert leverage on the frame for bending it longitudinally, against its resilient action, into a stressed form in which the frame supports the headrest in position over the top of the back squab and extends down the lateral sides of the back squab.

In one advantageous form which the invention may take, the frame in its normal unstressed condition may have a pair of spaced apart lateral members longitudinally bent or curved in dogleg or arch fashion, with either the concave or the convex side facing forwardly, and provided at the apex with a pair of front bracing arms which are bent or curved inwardly for engaging marginal portions of the front side of the back squab when the lateral frame members are applied to the lateral sides of the back squab respectively. These arms when bearing against the front side of the back squab provide a fulcrum for the frame regarded as a lever of the first order. At its lower end the frame may be open, and the lower ends of its lateral members may be provided with inwardly projecting rear bracing arms for engaging the rear side of the back squab, and these lower ends may be fitted with buckled bracing straps for fastening together and tightening across the rear side of the back squab. Similarly, at the third bracing point, at an upper region of the lateral frame members, further straps (and if desired inwardly projecting rear bracing arms) may be provided for engaging the rear side of the back squab. When an attachment thus constructed is fitted to a back squab the frame has to be bent back, utilising the front bracing arms as a fulcrum, and held by the straps in a stressed condition in which the frame assumes a form bringing the lateral frame members alongside the lateral sides of the back squab and the headrest in the desired position over the top of the back squab.

An example of the invention is illustrated in the accompanying drawings in which, FIG. 1 shows a perspective view of one embodiment of an attachment according to the invention, this figure showing the attachment in stressed condition as when mounted on the back squab of a car seat represented in dotted lines;

FIG. 2 is a side view of the attachment shown in full lines in its normal unstressed condition, and shown in dotted lines in its stressed condition when mounted on the back squab;

FIG. 3 is a fragmentary view showing the rear of the headrest, with a back cover thereof broken away for convenience of illustration;

FIGS. 4 and 5 are sections taken on the lines 4—4 and 5—5 respectively in FIG. 3;

FIG. 6 is a fragmentary view showing a detail modification.

The attachment shown in the drawings has a headrest 1 mounted at the top of a frame which, in this example, consists of a pair of frame members 2 made of a suitable resilient bendable bar, rod or wire material. These members are bent similarly but in mirror-image relation to each other to form upper and lower portions or arms 3 and 6 connected by intermediate inwardly bent U- or loop-shaped portions or arms 7, portions or shoulders 8 extending inwardly from the tops of the upper arms 3 to the top end portions 9 on which the headrest 1 is mounted, the frame members 2 thus being connected to each other at their tops by means of the headrest 1 itself. At the bottom of the frame members 2 the bottom ends of the lower arms 6 have inwardly bent U- or loop-shaped portions or arms 10 which afford anchorages for attachment of a pair of straps 11 fitted with a buckle 12, which interconnect the bottom ends of the frame members when the straps are fastened together. The arms 7 and 10 are adapted for engagement against the front and rear sides of a back squab 13 of a vehicle seat depicted in dotted outlines in FIGS. 1 and 2.

Another pair of straps 14 fitted with a buckle 15 are attached to the upper arms 3 of the frame members and interconnect these arms when the straps 14 are fastened together. These straps may be permitted to be slidable along the arms 3 so that they can be positioned suitably for the vehicle seat to which the headrest attachment is to be fitted, but since these straps are required to exert leverage on the arms 3 it is preferable to provide the latter with stops such as collars 16 fixed, e.g., by welding, on these arms to prevent the straps 14 from slipping too far down these arms. Alternatively, the arms 3 could be modified to provide them with bent U- or loop-shaped portions (like the arms 7) at their top region which afford anchorages for attachment of the straps 14. Such U- or loop-shaped portions could, if so desired, also be arranged so that they can be engaged against the rear side of the back squab 13 to assist the straps 14 when securing the attachment to the back squab.

The shoulder portions 8 may be padded by provision of pads 17. The arms 7 may also be padded, or they may be provided with bearing plates or discs (not shown) for engaging the front side of the back squab 13, which plates or discs may also be padded.

The attachment shown is adapted to be fitted to a vehicle seat so as to be positioned on the back squab 13 of the seat in the manner depicted in FIG. 1 and in dotted lines in FIG. 2. The normal unstressed condition of the frame members 2 is shown in full lines in FIG. 2. To fit the attachment, the frame members 2 are fitted over the lateral sides of the back squab 13 with the arms 10 and straps 11 positioned at the rear of the back squab. The straps 11 are fastened together and adjusted so that the arms 7 engage the front side of the squab 13 and the arms 10 and straps 11 are engaged with the back side of the squab, the lower arms 6 of the members 2 extending downwardly along the lateral sides of the squab, as shown in FIGS. 1 and 2. In this position, the frame members 2 still being unstressed, the upper part of the attachment above the arms 7, and in particular the arms 3 of the members 2, will be projecting forwardly at an inclination to the squab 13, as shown in full lines in FIG. 2. Now, by fastening together and tightening the straps 14 across the back side of the squab 13, the arms 3 and with them the upper part of the attachment are drawn back against the resilience of the frame into the position shown in dotted lines in FIG. 2, bringing the arms 3 alongside the lateral sides of the squab 13 and the headrest 1 into the desired position over the top of the squab 13.

By virtue of the resilience and longitudinal arching of the frame members 2 the attachment becomes firmly fixed to the back squab 13 when the straps 14 are sufficiently tightened, because the leverage applied thereby presses the arms 7 tightly against the front side of the squab and presses the arms 10 and straps 11 tightly against the back side of the squab, and the straps 11 and 14 hold the frame members 2 close to the lateral sides of the squab 13. The frame is so firmly and tightly fixed to the squab that the attachment does not ride up the squab when in use. However, if further precaution against this be desired, the frame members 2 could be provided at the bottom with an attached cord or tape for example, for tying the frame to a part of the frame of the vehicle seat.

An advantage of the invention is that it enables a headrest to be fixed on a car or the like seat without the front side of the back squab 13 becoming obstructed by straps or other parts of the fixture. With my attachment the front of the squab 13 is kept virtually clear, since the only parts of the attachment which appear there are the arms 7 which cover only comparatively insignificant areas adjacent the lateral edges of the squab. The other bracing devices 10, 11, 14 which appear at the back side of the squab 13 lie close to it and present little or no impediment or inconvenience to a rear seat occupant.

Car seats are of different sizes, which vary in length and width, and therefore an attachment which can fit or can easily be adjusted by the user to fit any size of car seat would have obvious advantages for the manufacturer, merchant and user. An attachment embodying the invention may readily be made in a form which provides that facility. The overall length of the frame, i.e. the frame members 2, is independent of the length of the squab 13 and accordingly does not need to be made adjustable. The frame may therefore be made of a single fixed length which will suit all lengths of squab made, whether short or long. One suitable frame length for this purpose has been found to be about 19 inches.

On the other hand, to suit the different squab widths encountered, the frame may be made adjustable in width in order to enable its lateral parts (arms 3 and 6) to be fitted closely to the lateral sides of the particular squab on which the headrest is to be mounted. This adjustability can be provided in various ways, one example of which is shown in FIGS. 3–5.

In the example illustrated the headrest 1 is constructed on a base plate or board 18 for the head cushion 19. For fixing the headrest to the top portions 9 of the frame members 2, the base 18 is provided with locating holes 20 into which the tips 21 (FIG. 4) of the portions 9, bent at right angles thereto, are inserted, and the portions 9 are clamped to the base 18 by means of a clamping plate or strap 22 which is screwed to the base 18 by screws 23 and which is provided with grooves 24 receiving the portions 9. A back cover plate 25 screwed to the base 18 by screws 26 conceals the assembly.

Provision of only a single hole 20 and groove 24 for each frame member 2 would give only a single and fixed spacing between the frame members, so that the frame would be of a fixed width. However, to permit the width of the frame to be adjusted to suit different widths of back squab 13, a row of holes 20 and corresponding grooves 24 are provided in the base 18 and strap 22 respectively for each portion 9, to afford alternative locations for these and thus giving a range of spacing adjustment between the frame members 2. Also, if desired, the holes 20 may be duplicated by provision of further sets such as 20a and 20b (FIG. 3) at different height positions in the base 18, to give a range of height adjustment of the headrest 1 relative to the frame.

The attachment may also be provided with a backrest or lumbar pad (not shown) which can be attached to the frame members 2, for instance detachably by means of tapes or straps attached to the pad, so that the frame members support the pad between them and the pad may be readily positioned at the required height along the frame members.

FIG. 6 illustrates a variant of the configuration of the upper part of the frame members 2. In this modification the straps 14 are attached to U- or loop-shaped anchorages formed at the tops of the arms 3 which in this case are adapted to extend to the rear edges of the lateral sides of the squab 13, and from these rear edges the portions 8, connecting the arms 3 to the top portions 9 of the frame members, extend forwardly over the lateral sides of the squab to the front edges thereof, and thence are bent to extend upwardly across the upper corners of the front side of the squab 13, to join the top portions 9. Such a modified configuration may be useful to cater not only for the types of vehicle seats having square-topped back squabs, i.e., with definite upper corners of small or virtually no radius (as depicted in FIG. 1, for which the configuration of frame members shown in FIG. 1 is especially adapted), but also for those types of seats having back squabs which are well-rounded or curved at the top, i.e., with upper corners of large radius or virtually no corners at the top.

The foregoing is illustrative of the principles of the invention, which is capable of being embodied in many other forms than the specific examples described. In practising the invention numerous modifications, changes and equivalents which will now readily occur to those skilled in the art may be made in the materials, configurations, details of construction and arrangement of the elements of the article, and accordingly all such suitable modifications, changes and equivalents may be resorted to, without departing from the scope of the invention as defined by the claims.

I claim:

1. A headrest attachment for a vehicle seat, comprising in combination
    a frame including a pair of longitudinally resilient side members,
    a headrest,
    means for mounting said headrest at the top of said frame,
    bracing means at three longitudinally spaced regions of each side member for longitudinally bending said side members simultaneously to secure said frame to the back squab of a vehicle seat and to maintain said side members in stressed, rigidified condition.

2. The headrest attachment of claim 1, wherein
    each of said side members is longitudinally bent,
    inwardly projecting front bracing arms at the apex of the bend in each side member to provide a fulcrum, engageable with the front side of said back squab, for upper and lower portions of said side members which lie at opposite sides of said front bracing arms and which constitute lever arms of a lever of the first order,
    and bracing straps attached to said upper and lower portions respectively to interconnect said side members and secure said frame to said back squab and longitudinally bend said side members when said straps are fastened together across the rear side of said squab.

3. The headrest attachment of claim 2, wherein said side members include inwardly projecting rear bracing arms at their bottom ends for engaging the rear side of said back squab, and the said straps which are attached to said lower portions of said side members are anchored to said rear bracing arms.

4. The headrest attachment of claim 2, wherein said side members include inwardly projecting rear bracing arms at the top of their said upper portions for engaging the rear side of said back squab, and the said straps which are attached to said upper portions are anchored to said rear bracing arms thereof.

5. The headrest attachment of claim 2, wherein each of said side members consists of a rod of resilient bendable material bent into a configuration forming said upper and lower portions of each side member connected to each other by an intermediate inwardly bent U-shaped portion forming said front bracing arm of each side member.

6. The headrest attachment of claim 1, wherein said side members are separate, said means for mounting said headrest to the top of said frame connecting said side members rigidly to each other at their tops.

7. The headrest attachment of claim 2, wherein said side members are structurally separate from each other, said means for mounting the headrest at the top of the frame connecting said side members rigidly to each other at their tops.

8. The headrest attachment of claim 1, and further comprising means to adjustably vary the width of said frame.

9. The headrest attachment of claim 6, wherein said headrest includes a base and means to clamp the tops of said side members to said base, said base and said clamping means having locating means providing a plurality of alternative locating positions for said side members whereby to permit said side members to be clamped to said base at various spacings apart.

10. The headrest attachment of claim 9, wherein said locating means further provide additional alternative locating positions for said side members at different heights on said base whereby to permit mounting of said headrest at various heights relative to said frame.

11. In combination with a vehicle seat of the type having a back squab,
    a pair of vertically elongate and longitudinally resilient side frame members positioned along the opposite sides of said back squab whereby said back squab is straddled by said side frame members,
    means securing each side frame member in longitudinally bent condition to said back squab, whereby each side frame member is held in prestressed and rigidified condition,
    and a headrest carried by said side frame members adjacent the top of said back squab.

References Cited

UNITED STATES PATENTS

| | | | |
|---|---|---|---|
| 2,464,435 | 3/1949 | Conradt | 297—397 |
| 3,012,819 | 12/1961 | Mungovan | 297—399 |
| 3,084,978 | 4/1963 | Johansson | 297—397 |
| 3,129,975 | 4/1964 | Emery | 297—397 |
| 3,151,911 | 10/1964 | Eichorst | 297—397 |

CASMIR A. NUNBERG, *Primary Examiner.*